(12) United States Patent
Fang

(10) Patent No.: US 6,990,150 B2
(45) Date of Patent: Jan. 24, 2006

(54) SYSTEM AND METHOD FOR USING A HIGH-DEFINITION MPEG DECODER TO EXTRACT MULTIPLE STANDARD DEFINITION FRAMES FROM A HIGH-DEFINITION FRAME

(75) Inventor: Bill Fang, Rockwall, TX (US)

(73) Assignee: Enseo, Inc., Richardson, TX (US)

( * ) Notice: Subject to any disclaimer, the term of this patent is extended or adjusted under 35 U.S.C. 154(b) by 775 days.

(21) Appl. No.: 10/145,316

(22) Filed: May 14, 2002

(65) Prior Publication Data
US 2003/0215017 A1 Nov. 20, 2003

(51) Int. Cl.
H04N 7/12 (2006.01)

(52) U.S. Cl. ............ 375/240.25; 375/240; 375/240.01; 375/240.12; 375/240.26

(58) Field of Classification Search ............ 375/240.25, 375/240.24, 240.26, 240, 240.01, 240.03, 375/240.12; 348/441
See application file for complete search history.

(56) References Cited

U.S. PATENT DOCUMENTS

| | | | |
|---|---|---|---|
| 5,303,044 A | 4/1994 | Richards | 348/445 |
| 5,325,131 A | 6/1994 | Penney | 348/706 |
| 5,497,198 A | 3/1996 | Kim | 348/445 |
| 6,081,297 A | 6/2000 | Lee | 348/426 |
| 6,184,935 B1 | 2/2001 | Iaquinto et al. | 348/441 |
| 6,226,038 B1 | 5/2001 | Frink et al. | 348/443 |
| 6,279,045 B1 | 8/2001 | Muthujumaraswathy et al. | 710/5 |
| 6,765,966 B2 * | 7/2004 | Vince | 375/240.26 |
| 6,798,833 B2 * | 9/2004 | Lee et al. | 375/240.03 |

* cited by examiner

Primary Examiner—Allen Wong
(74) Attorney, Agent, or Firm—John A. Thomas

(57) ABSTRACT

The system and method extracts a predetermined number of Standard Definition television frames from an MPEG-encoded High Definition video frame. The MPEG-encoded High Definition frame is decoded to recover the High Definition scan lines. Scan lines are alternately output from the decoder from the top and bottom of the High Definition frame (or from a frame buffer, after parsing, if the decoder is not capable of this operation). The pixel data in the alternate scan lines is separated into the predetermined number of Standard Definition frames, Standard Definition timing signals are then generated for each Standard Definition frame, and the Standard Definition data is output to a video encoder.

22 Claims, 7 Drawing Sheets

SYSTEM AND METHOD FOR USING A HIGH-DEFINITION MPEG DECODER TO EXTRACT MULTIPLE STANDARD DEFINITION FRAMES FROM A HIGH-DEFINITION FRAME

COMPUTER PROGRAM LISTING APPENDIX

The source code for VHDL specification of the preferred embodiments is submitted on compact disk as a computer program listing appendix. The material on the compact disk is incorporated by reference. Two identical compact disks have been submitted. Each compact disk contains seven files: audout.vhd (5,138 bytes); av_timing.vhd (8,233 bytes); inparse.vhd (11,591 bytes); insdram_ctrl.vhd (4,490 bytes); out_sdram_ctrl.vhd (10,579 bytes); sdout_ctrl.vhd (37,175 bytes); and ch_separator.vhd (10,810 bytes). The disks were created on May 2, 2002.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This application concerns the field of digital television, specifically, the construction of High Definition television frames so that four Standard Definition frames may be extracted from the data in one High Definition frame.

In the United States a standard, the Advanced Television System Committee (ATSC) standard defines digital encoding of high-definition television (HDTV) signals. A portion of this standard is essentially the same as the MPEG-2 standard, proposed by the Moving Picture Experts Group (MPEG) of the International Organization for Standardization (ISO). The standard is described in an International Standard publication entitled, "Information Technology-Generic Coding of Moving Pictures and Associated Audio, Recommendation H.626," ISO/IEC 13818-2, IS, 11/94 which is available from the ISO. The MPEG-2 standard is actually several different standards. In MPEG-2 several different profiles are defined, each corresponding to a different level of complexity of the encoded image.

For each profile, different levels are defined, each level corresponding to a different image resolution. One of the MPEG-2 standards, known as Main Profile, Main Level is intended for coding video signals conforming to existing television standards (e.g., NTSC and PAL). Another standard, known as Main Profile, High Level is intended for coding high-definition television images. Images encoded according to the Main Profile, High Level standard may have as many as 1,152 active lines per image frame and 1,920 pixels per line. The standard for HDTV encoding in the United States is a subset of this standard, having as many as 1,080 lines per frame, 1,920 pixels per line and a maximum frame rate, for this frame size, of 30 frames per second. The Main Profile, Main Level standard, on the other hand, defines a maximum picture size of 720 pixels per line and 567 lines per frame. The maximum data rate for the Main Profile, High Level standard is far greater than the maximum data rate for the Main Profile, Main Level standard.

In order for a digital HDTV video signal to fit in the transmission bandwidth of standard systems (i.e., systems conforming to National Television Systems Committee (NTSC) or Phase Alternate Line (PAL) standards), the HDTV video signal may typically be compressed using a ratio of about 5:1. For example, the NTSC standard requires an aspect ratio (ratio of width to height) of 4:3 with 525 scanning lines per picture and a television signal bandwidth of 6 MHz. The PAL standard specifies 625 scanning lines per picture and a television signal bandwidth of 8 MHz. Standard Definition television resolution video formats are typically 704-pixel-by-480-line or 640-pixel-by-480-line.

In contrast, HDTV-resolution video data typically requires 30 MHz of bandwidth, doubling the number of scan lines in a frame and changing the aspect ratio to 16:9. HDTV-resolution video is typically 1920-pixel-by-1080-line, although it may be in other formats, such as 1280-pixel-by-720-line in progressive or interlaced formats. High Definition (HD) video data may include any data at a resolution higher than Standard Definition (SD) video data, such as, for example, data with a resolution greater than 525 scan lines having a component rate of more than 30 frames per second, with 8 or 10-bit precision. HD data may be interlaced or progressively scanned and the present invention is not limited to either format.

The MPEG-2 standard defines a complex syntax that contains a mixture of data and control information. Some of this control information is used to enable signals having several different formats to be covered by the standard. These formats define images having differing numbers of picture elements (pixels) per line, differing numbers of lines per frame or frame and differing numbers of frames or frames per second. In addition, the basic syntax of the MPEG-2 Main Profile defines the compressed MPEG-2 bit stream representing a sequence of images in five layers, the sequence layer, the group of pictures layer, the picture layer, the slice layer, and the macroblock layer. Each of these layers is introduced with control information. The present disclosure assumes the existence of a device capable of decoding encoded HDTV data into digital video. Such devices exist and are well known in the art.

At the present, Standard Definition video formats still dominate the video industries. There is a need for a method that uses an HD MPEG decoder as multiple independent SD MPEG decoders to decode Main Profile at Main Level MPEG streams and extract the independent SD video frames.

SUMMARY

The invention includes a method for extracting a predetermined number of Standard Definition frames from an MPEG-encoded High Definition video frame containing a predetermined number of Standard Definition frames. The steps comprise: passing the MPEG-encoded High Definition video frame through a High Definition MPEG decoder to recover the High Definition decoded data; the decoded data comprising High Definition scan lines; each scan line comprising pixel data; alternately outputting scan lines from the MPEG decoder from the top and bottom of the High Definition frame; and, separating the pixel data in the High Definition scan lines into the predetermined number of frames of Standard Definition scan lines. The step of separating the pixel data further includes skipping over the unused portion of each High Definition scan line until the start of active video pixels; reading pixel data from the start of the active video pixels until a completed Standard Definition scan line is read; and, asserting a write strobe for the FIFO corresponding to each Standard Definition frame when a completed scan line for that frame is read.

The method continues with the steps of writing the pixel data in the separated scan lines into a number of FIFOs corresponding to the predetermined number of encoded Standard Definition frames; generating Standard Definition timing signals for each Standard Definition frame; and, outputting the Standard Definition timing signals and the pixel data in each FIFO to a video encoder communicating with the respective FIFO. The method preferably includes the step of extracting audio data from the HANC region of the High Definition scan line.

Another embodiment of the invention uses an MPEG decoder that is not capable of alternately outputting scan lines from the top and bottom of a High Definition frame. In this case, the preferred method is to parse the High Definition decoded data stream into High Definition scan lines and write these scan line to a frame buffer until the frame buffer holds High Definition scan lies defining one High Definition frame.

DETAILED DESCRIPTION

High-definition MPEG Decoders

Figure 1:
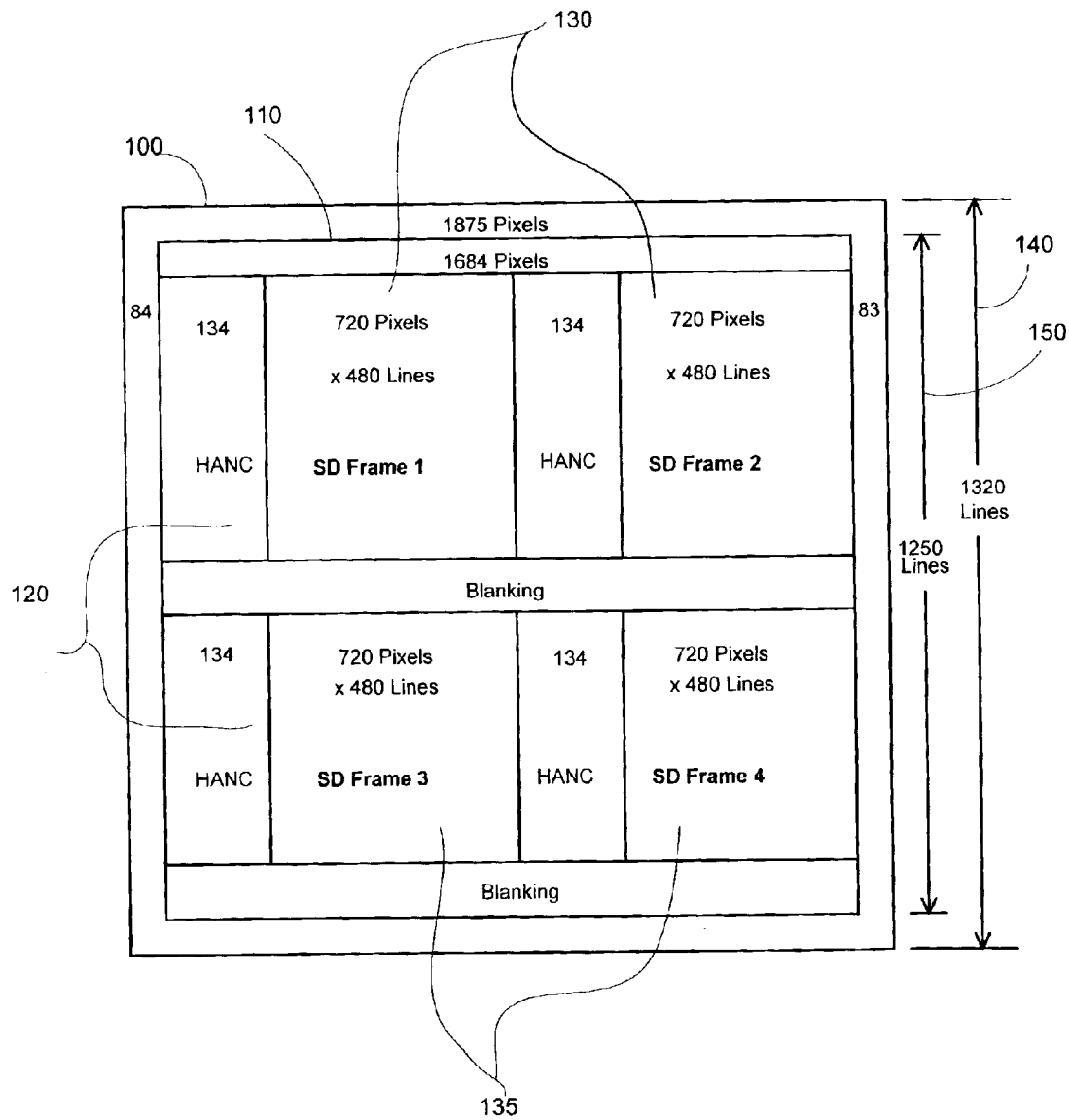
FIG. 1 shows the positions of Standard Definition frames within a High Definition frame for the NTSC standard.

A High Definition MPEG video decoder is capable of decoding 60 to 80 Mbit/sec MPEG streams in a resolution up to 1920×1080 (1080i). Such decoders are designed to decode high definition MPEG data streams, Main Profile at High Level. For example, the TL850 Digital TV Decoder chip manufactured by TeraLogic, Inc., of Mountain View, Calif., is capable of decoding one High Definition or four Standard Definition streams.

This disclosure describes two methods of using such a High Definition MPEG decoder (200) as four independent Standard Definition MPEG decoders to decode Main Profile at Main Level MPEG streams and extract independent SD frames. The preferred embodiment of the invention provides four independent SD decoded video streams (230) from one HD decoder (200) having first and second SD video frames (130) and third and fourth SD video frames (135) encoded in each HD frame (100), as described below. The invention is not limited, however, to HD frames having exactly four SD frames encoded therein. Fewer SD frames may be encoded in each HD frame and decoded and parsed out as described below. Also, non-standard television formats may allow for more than four lower-definition frames to be encoded into one HD frame.

Figure 2:
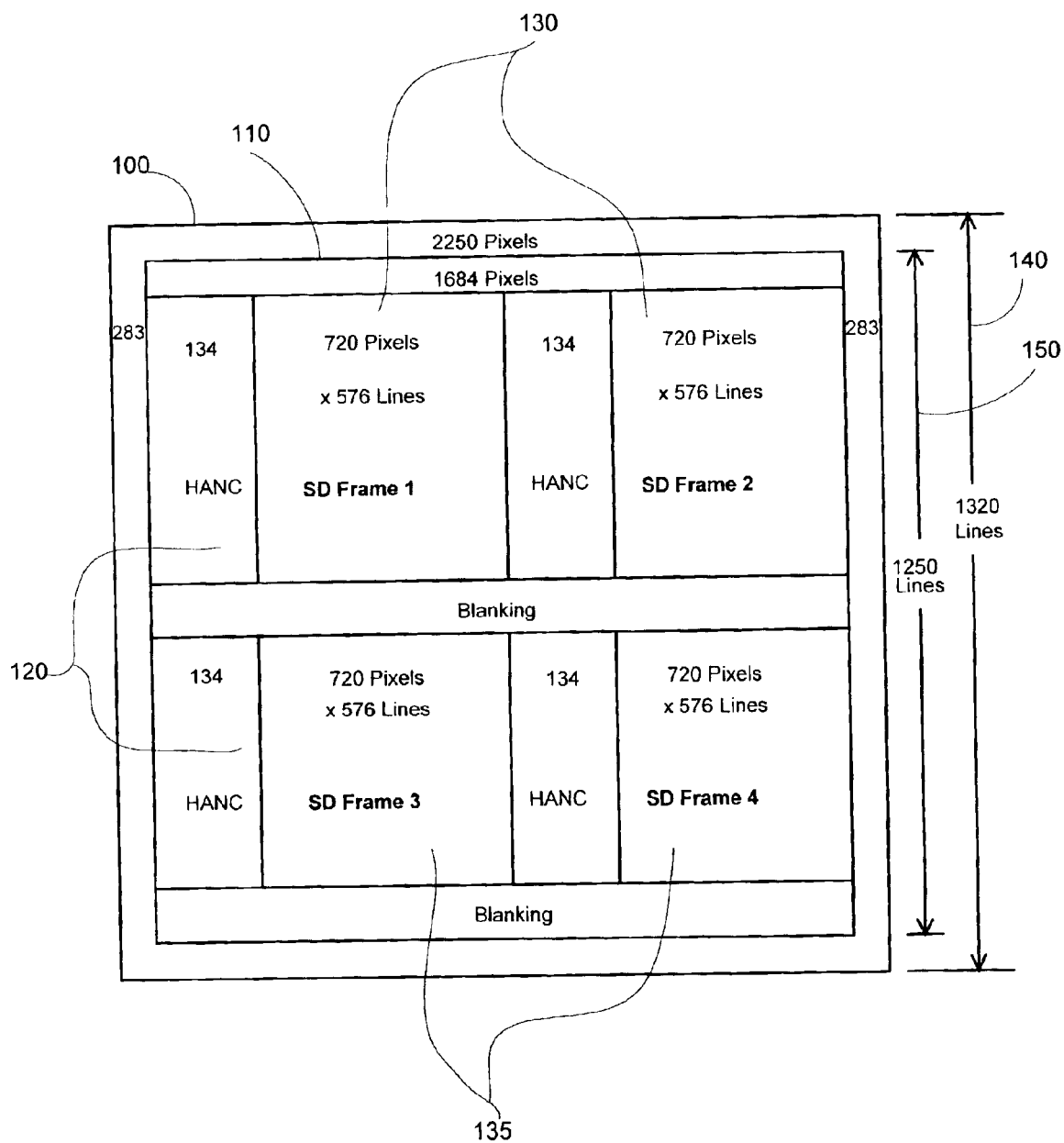
FIG. 2 shows the positions of Standard Definition frames within a High Definition frame for the PAL standard.

Four SD video frames (130, 135) can generally be positioned in the HD frame (100) as shown in FIGS. 1 and 2. In general, an HDTV MPEG video decoder, such as the TL850 may be programmed to accept as input four independent SDTV data streams, and place the SD frames within the HD frame in a predetermined way.

Using such a decoder, one may program it to define a High Definition television display surface within a High Definition frame buffer suitable for the application disclosed. In the preferred embodiment, the High Definition television display surface has a pixel width equal to twice the pixel width of the predetermined Standard Definition television format, plus twice the pixel width of the horizontal ancillary data region (HANC), and a depth equal to twice the line depth of the Standard Definition television format, plus twice the depth of two blanking intervals, thereby defining four Standard Definition television frames on the High Definition television display surface.

An MPEG decoder (200) will accept the HD stream having the embedded SD frames (130, 135) and decode four standard-definition Main Profile at Main level MPEG streams simultaneously. In the examples shown, the HD decoder (200) must be configured in 1920×1080 interlaced format. The ATSC 1920×1080/29.97 format will match the NTSC timing, and the ATSC 1920×1080/25 will match the timing for PAL.

FIGS. 1 and 2 show examples of how the HD frame (100) can be divided into four separate SD display frames (130, 135). The HD frame (100) should preferably be in 1080i format. For NTSC outputs, the overall horizontal width of the HD frame (100) will need to be configured as 1875 pixels and its vertical height (140) as 1320 lines. The active video region (110) will need to be defined as 1684 pixels horizontally and 1250 lines vertically. The active region (110) is a little wider than the 1080i format, but it is typically adjustable in the MPEG decoder (200). A 29.97 Hz frame rate should be used for NTSC. The HD pixel rate will be at the standard 74.25 MHz. For PAL outputs (FIG. 2), the overall horizontal width (100) will need to be configured as 2250 and the vertical height (140) as 1320 lines of the HD frame (100). The active video region (110) will need to be defined as 1684 pixels horizontally and 1250 lines vertically which is also a little wider than the 1080i format. A. 25 Hz frame rate should be used for PAL, The HD pixel rate will be the standard 74.25 MHz.

The horizontal ancillary data regions (120) as shown in FIGS. 1 and 2 can be used for audio. The Society of Motion Picture and Television Engineers (SMPTE) 272M format should preferably be followed for audio data transfers. As described below, the audio data can be parsed out and output to an audio DAC, or an audio decoder (not shown) if it is compressed data.

Implementation of the Embodiments

The methods and systems described below may be implemented using a Field Programmable Gate Array (FPGA). A FPGA includes an array of configurable logic blocks that are programmably interconnected to each other and to programmable input-output blocks. The interconnections are provided by configurable horizontal and vertical interconnect lines, which may be connected to one another using programmable interconnect points. This collection of configurable elements may be customized by loading configuration data into internal configuration memory cells that define how the logic blocks, interconnect blocks, and I/O blocks are configured. The configuration data may be read from memory (i.e., an external PROM) or written into the FPGA from an external device. The collective states of the individual memory cells then determine the function of FPGA. Typical FPGA's suitable for this application are the FLEX10K, manufactured by Altera Corporation of San Jose, Calif., or the Spartan II, manufactured by Xilinx, Inc., of San Jose, Calif.

The design of an FPGA may be specified in VHDL, or "VHSIC Hardware Description Language." The acronym "VHSIC" means "Very High Speed Integrated Circuits." VHDL programs can specify documentation, verification, and synthesis of large digital designs. Also, VHDL can be used to describe hardware by structural, data flow or behavioral methods. VHDL is a standard (VHDL-1076) developed by the Institute of Electrical and Electronic Engineers. It is conventional in the art to specify devices such as the FPGA implementations of the present embodiments in VHDL. Accordingly, the VHDL source code and pseudo-code specifying such FPGA implementations are provided in the computer program listing appendix attached to this application.

This application describes embodiments of the invention using FPGA devices and VHDL code. Such a description clearly discloses and enables the invention, because the high-level description of the programmed FPGA uniquely defines the functions of the device. The reader should understand, however, that the invention may be embodied in other ways, such as by an application-specific integrated circuit (ASIC), or circuits, a programmed microprocessor, or a general-purpose computer system having a mass-storage device, a central-processing unit, and RAM. Such a general-purpose computer system would then be programmed to carry out the steps described in this specification, typically reading programming instructions from magnetic media, CD-ROM, ROM or RAM. Thus the implementation of the embodiments of the invention is not limited to FPGA devices.

Computer Program Listings in Appendix

| Program file name | Function |
| --- | --- |
| ch_separator.vhd | For First Method. Accepts decoded HD pixel data and parses the incoming pixel data to four channels of SD video by writing the scan lines holding the pixel data into the corresponding FIFO for each channel. Shown as 210 in FIG. 3. |
| stdout_crtl.vhd | For both Methods. Implements video encoders that accept SD pixel data, extracts audio channels, and formats the video data to NTSC or PAL timing. |
| insdram_crtl.vhd | For Second Method. Accepts decoded HD pixel data and outputs it to the sdram_ctrl.vhd module. Maintains separate address counters to record the data in separate memory areas in the sdram_ctrl memory. |
| out_sdram_ctrl.vhd | For Second Method. Reads pixel data from sdram_crtl module and writes to appropriate output FIFOs for each channel. Shown as 245 in FIG. 4. |
| inparse_b.vhd | For Second Method. Accepts decoded HD pixel data, filters out blank area and writes to the 32-bit wide FIFO of the HD frame buffer. Generates status flags to indicate the video frame position associated with the YVU data, frame, vertical sync and horizontal sync. Shown as 235 in FIG. 4. |
| av_timing.vhd | For both Methods. Generates required timing for NTSC and PAL outputs |
| audout.vhd | For both Methods. Processes the audio data. |

First Method

This method can be used if the HD MPEG decoder (200) has the flexibility of defining the sequence of output scan lines. The output display controller in the MPEG decoder (200) will need to output the line sequences in the following order:

Line 1 (line 1 of SD frames 1 and 2)
Line 540 (line 1 of SD frames 3 and 4)
Line 2 (line 2 of SD frames 1 and 2)
Line 541 (line 2 of SD frames 3 and 4)

For the NTSC format, each HD frame is 1875 pixels by 1320 lines. The layout of the scan lines in the HD frame (100) for the NTSC format is shown as follows:

```
|----84----|---134---|------720------|---134---|------720------|----84----|
  unused    HANC(48)   Active video    HANC(48)  Active video    left-over
```

For the NTSC format of the preferred embodiment, the right-most 48 words of the HANC regions (120) are used for audio. SD frames 1 and 2 (130) within the HD frame (see FIG. 1) use 262 scan lines. SD frames 3 and 4 (135) use 263 scan lines.

For the PAL format, each HD frame (100) is 2250 pixels by 1320 lines. The layout of the scan lines in the HD active region (110) for the PAL format is shown as follows:

```
|---271---|---134---|------720------|---134---|------720------|---271---|
  unused    HANC(48)  Active video    HANC(48)  Active video    unused
```

For the PAL format of the preferred embodiment, the right-most 48 words of the HANC regions (120) are also used for audio. SD frames 1 and 2 (130) within the HD frame (see FIG. 2) use 312 scan lines. SD frames 3 and 4 (135) use 313 scan lines.

Other embodiments of the invention are possible of course, using different numbers of scan lines or different frames for carrying audio information.

Figure 3:
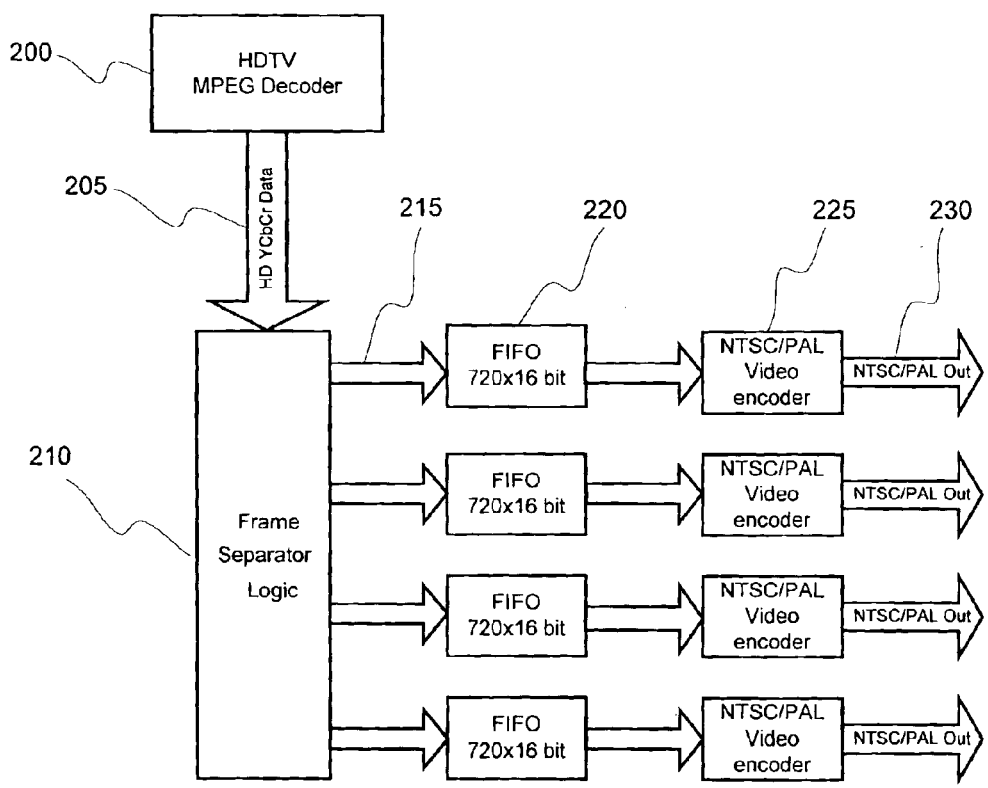
FIG. 3 is a block diagram of an embodiment of the invention for separating Standard Definition frames from decoded High Definition data, where the MPEG decoder allows determination of the sequence of output scan lines.

FIG. 3 is a block diagram showing the components of the first method. The first method comprises the step of alternating scan lines between the lower and upper halves of the HD frame (100), then placing the digital data which represents the scan lines in a cache first-in-first-out (FIFO) buffer for each independent SD stream (215). Thus, in the example here, four FIFO buffers (220) will be needed. Each FIFO buffer (220) must be large enough to hold one line of SD video, which is 720 pixels. It is also necessary to generate the NTSC or PAL timing signal and output the pixel data into separate NTSC or PAL video encoders (225).

Referring to FIG. 3, an HDTV MPEG decoder (200) decodes the compressed HD data. This stream of decoded pixel data (205) is received by the frame-separator component (210) communicating with the decoder (200) of the preferred embodiment, where the four SD frames (130, 135) are extracted and output as digital SD video streams (215). One 720 by 16-bit FIFO (220) communicating with frame-separator component (210) holds each scan line of a digital SD stream (215). A video encoder (225) communicating with the FIFOs (220) supplies the necessary timing and converts the digital scan line to NTSC or PAL video streams (230).

Figure 5:
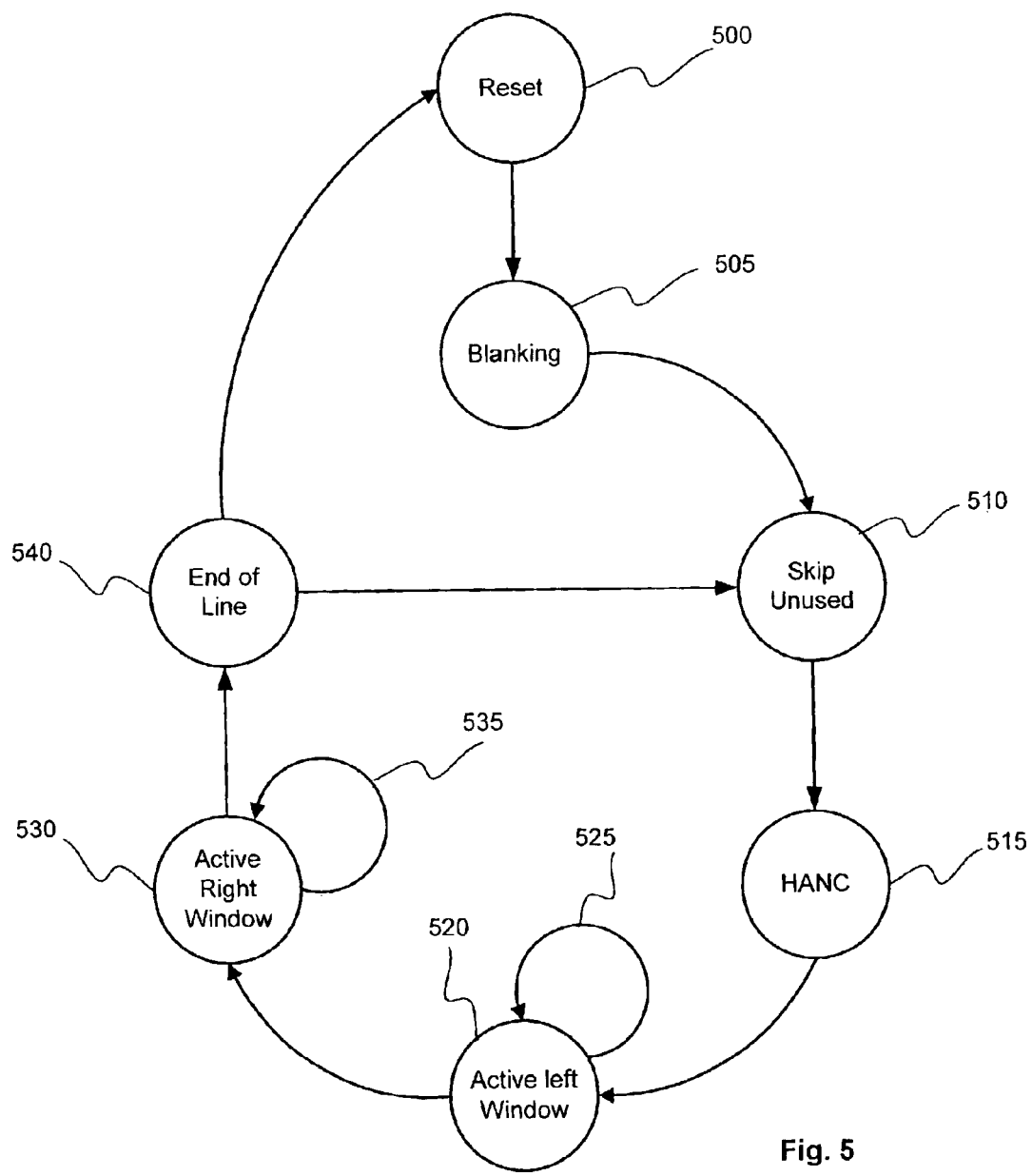
FIG. 5 is a state machine diagram showing the logic of the frame-separation component of the First Method described below.

FIG. 5 is a state diagram depicting the specification for the first frame-separator component (210) of the preferred embodiment of both Methods. The VHDL code and pseudo-code for this first frame-separator component (210) appears in ch_separator.vhd in the computer program listing appendix. The ch_separator.vhd code defines state machines for an input FIFO (not shown), four 32-bit by 8-word output FIFOs (not shown), two 32-bit latches to latch incoming video data (not shown), and a component (not shown) for parsing the incoming video pixel data and writing it to the output FIFOs (220).

Referring to FIG. 5, the first frame-separator component (210) starts in the reset state (500). Execution proceeds on path 505 at the start of a video frame to the blanking state (510). Execution proceeds on path 515 at the start of the first active line to the skip-pixel state (520), which skips the unused portion of the scan line to the HANC region (120) of the frame (shown in FIGS. 1 and 2). Execution then proceeds along path 525 to the HANC state (530). In the HANC state, the audio data is extracted to the audout.vhd code. At this point, following path 535, the machine is at the start of active video pixels. In the active-left-frame state (540), the machine asserts a write strobe for the first FIFO, if at the top of an SD frame, else, it asserts a write strobe for the third FIFO, asserting either when a completed SD scan line is read. A completed SD scan line is read when the number of pixels in an SD frame is counted (720 pixels for NTSC and PAL frames).

Execution then proceeds along path 545 to the active-right-frame state 550. Here the machine asserts a write strobe for the second FIFO, if at the top of an SD frame, else, it asserts a write strobe for the fourth FIFO, asserting either when a completed SD scan line has been collected.

Following further in FIG. 5, at the end of an input scan line, execution proceeds along path 555 to the end-of-line state (560) where the machine waits for a new scan line. Upon receiving a new active line, execution proceeds along path 565 to the skip-pixel state (520); else, all scan lines in the HD frame are processed, and execution proceeds along path 570 to the reset state (500).

Now that the SD frames are extracted, the system will pass the frame data to video encoders that accept SD pixel data, extract audio channels, and format the video data to NTSC or PAL timing. Example VHDL source code for this function is included in stdout_ctrl.vhd in the computer listing appendix.

The audio data in the HANC region (120) can be parsed out by the first frame-separator component (210) and output it to an audio DAC, or an audio decoder (not shown) if it is compressed data. Example VHDL source code is included for processing the audio data: audout.vhd, in the computer program listing appendix.

Second Method

Figure 4:
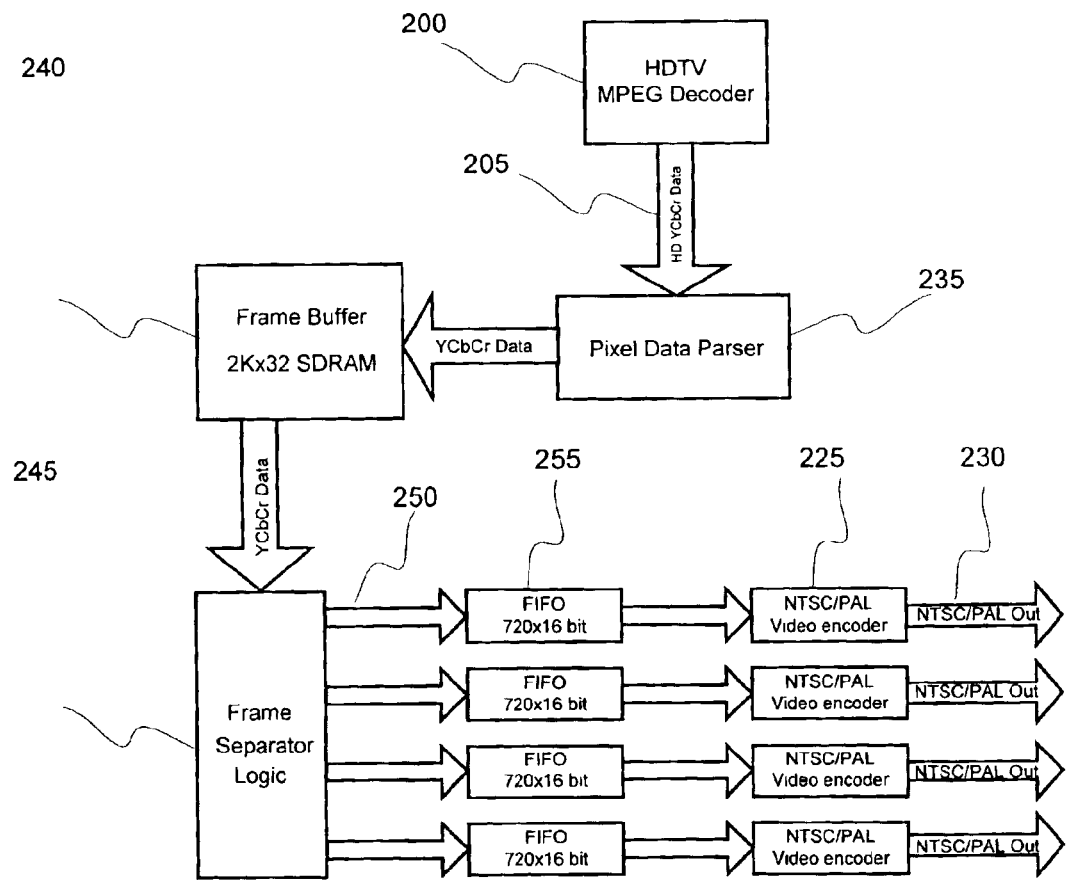
FIG. 4 is a block diagram of an embodiment of the invention for separating Standard Definition frames from decoded High Definition data, where the MPEG decoder does not allow determination of the sequence of output scan lines.

This method may be used if the MPEG decoder (200) does not have the flexibility of alternating the scan lines between the upper half of the display and the lower half of the display. In this case, an external frame buffer (240) must be used to hold one frame of HD video data. Referring to FIG. 4, the MPEG decoder (200) will output pixel data to the external frame buffer (240). The external frame buffer (240) only needs to hold one frame of video. As before, an FPGA may be programmed to perform the necessary functions.

A pixel-data parser (235) parses the HD pixel data stream (205) into HD scan lines and stores the scan-line data in the frame buffer (240). See the VHDL source code in inparse.vhd and insdram_ctrl.vhd in the computer program listing appendix. The pixel-data parser (235), as described in inparse.vhd, accepts the HD video data, filters out blank areas and writes out to the frame buffer (240). The pixel-data parser (235) will generate status flags to indicate the video frame position associated with the YVU data, frame, vertical sync and horizontal sync. The pixel data stream (205) from the MPEG decoder (200) is in 16 bit format, Y at bit 15-8 and Cb/Cr at 7-0. The pixel-data parser (235) latches the data and stores it in the frame buffer (240), here, a 2K×32 FIFO. Each 32-bit FIFO in the frame buffer (240) will contain 2 video pixels in the format of Cb0, Y0, Cr0, Y1. The module insdram_ctrl.vhd accepts the HD video data from the FIFO and outputs it to the frame buffer (240). Separate address counters are maintained to record the data in separate memory areas in the memory in the frame buffer (240).

Figure 7:
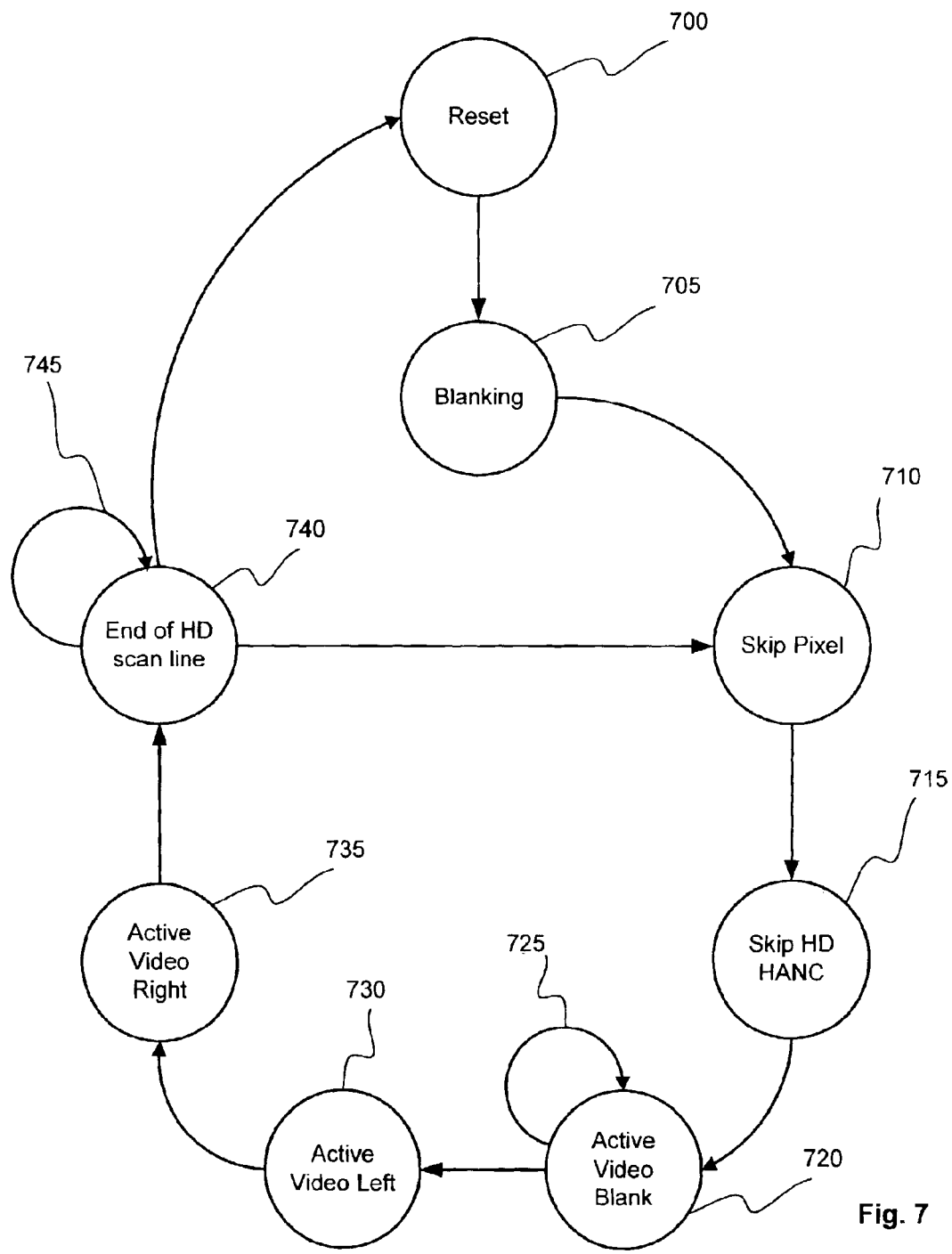
FIG. 7 is a state diagram showing the logic of the input-parsing component of the Second Method described below.

FIG. 7 is a state diagram describing the logic of the input-parsing component (235), shown in the example VHDL code in inparse.vhd. At state 700 the input-parsing component (235) is reset. At the start of a video frame, the input-parsing component (235) skips the blanking field until the start of the first active line. At state 710 the input-parsing component (235) skips over the unused pixels as shown in FIGS. 1 and 2 until the start of the HANC region. At state 715, the parser skips the HANC region, extracting the audio data to an audio FIFO. In the next states, 720 and 725, the parser skips the horizontal blank area. In the following two states, 730 and 735, the parser extracts active pixel data for the right or left window, respectively, into the appropriate FIFO and records the corresponding horizontal and vertical sync values. At state 740, we have reached the end of an HD scan line, and we are waiting (state 745) for the start of a new active line. If a new active line is present, the parser proceeds to state 710; otherwise all active lines have been received and the parser proceeds to reset state 700.

Next, pixel data is read from the frame buffer (240). The second frame-separator component (245) reads data from the frame buffer (240), parses out the SD frames, and writes into the appropriate output FIFO (255), thus extracting separate SD video frames (130, 135).

Figure 6:
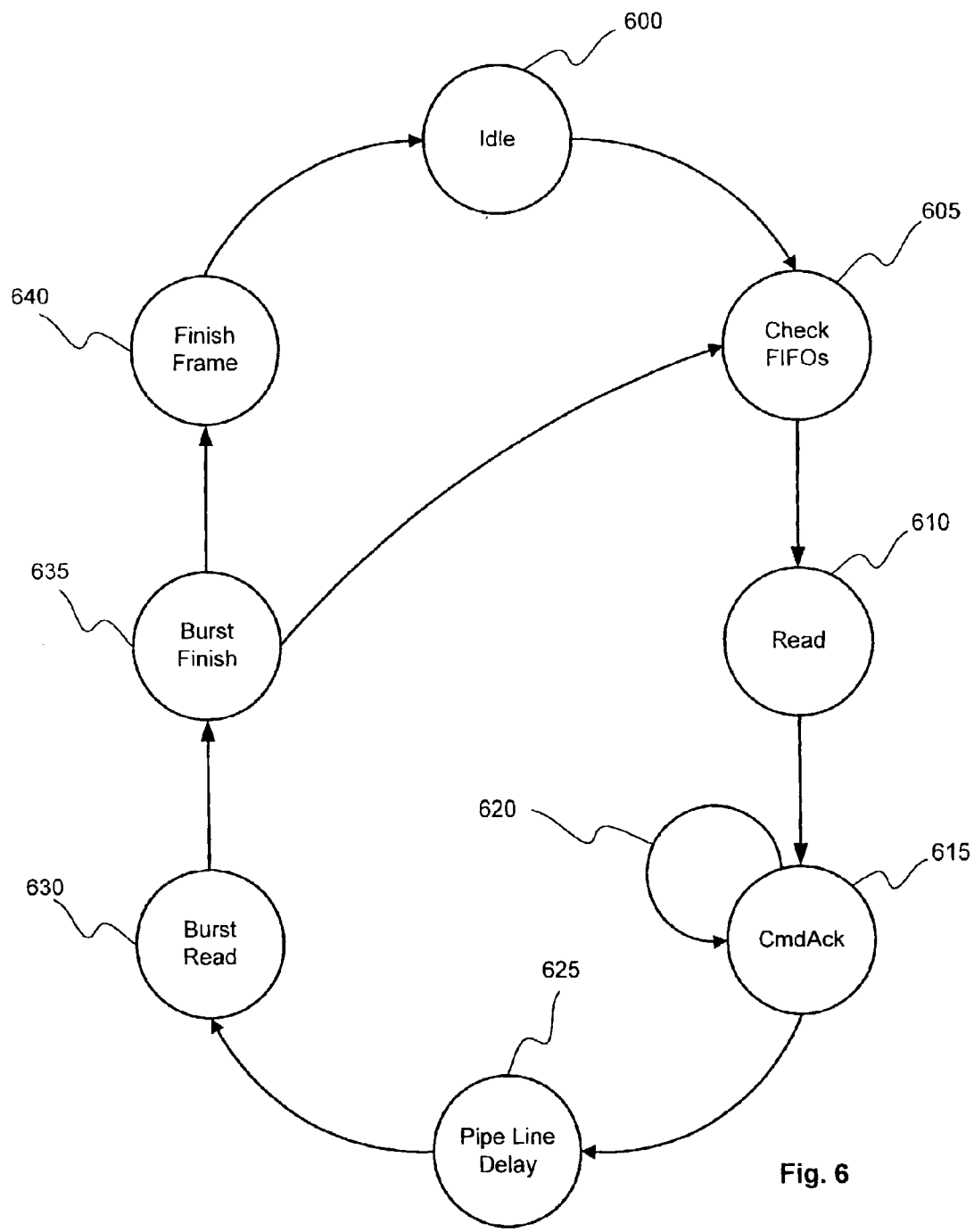
FIG. 6 is a state machine diagram showing the logic of the frame-separation component of the Second Method described below.

FIG. 6 is a state diagram for the second frame-separating component (245), the functions of witch are disclosed in the example VHDL code in outsdram.ctrl, in the computer listing appendix. The machine starts in the idle state (600). In this state, all SD FIFO buffers internal to the second frame-separator component (245) are reset. A counter for the SD frames is also reset. Execution proceeds along path 605 with the start of a new HD video frame to the check-FIFOs state (610). At this state (610), the machine checks to see if the SD FIFOs are less than half empty. If they are, then in the read state (620), the machine asserts an SDRAM read request. The SDRAM address base is set on the SD frame number and the address counter. Execution then proceeds along path 625 to the command-acknowledge state (630). When the SDRAM acknowledges, execution proceeds along path 635 to the pipe-line delay state (640). After this delay, execution proceeds along path 645 to the burst read state (650). Traversing path 655 reaches the burst-finish state, and the FIFO is filled.

After state 660, execution proceeds along path 665 to the check-FIFOs state (610) if another SD frame remains to be read; else, execution proceeds along path 670 at the end of an HD video frame to the finish-frame state (675). At this time, execution proceeds along path 680 to the idle state (600).

In the second method, the FIFOs (not shown) internal to the frame buffer (240) need not be as large as those needed in the first method. A FIFO size of 128 by 8 bit will be sufficient to serve as a cache buffer.

There are four channels of output FIFO (255), each 720×16 bit, for holding one line of digital SD video. As before, an NTSC/PAL video encoder (225) and supplies the necessary timing signals according to conventional standards and converts the digital scan line to NTSC or PAL video streams (230). See the VHDL code in av_timing.vhd and sdout_ctrl.vhd in the computer program listing appendix.

As in the first method, the audio data can be parsed out by the second frame-separator component (245) and output it to an audio DAC, or an audio decoder (not shown) if it is compressed data. An example VHDL source code is included for processing the audio data: audout.vhd, in the computer program listing appendix.

Although I have described the invention in terms of specific embodiments, I anticipate that alterations and modifications of it will no doubt become apparent to those skilled in the art. I therefore intend that the following claims be interpreted as covering all such alterations and modifications as fall within the scope of the invention.

I claim:

1. A method for extracting a predetermined number of Standard Definition frames from an MPEG-encoded High Definition video frame containing a predetermined number of Standard Definition frames, the method comprising:

passing the MPEG-encoded High Definition video frame through a High Definition MPEG decoder to recover the High Definition decoded data; the decoded data comprising High Definition scan lines; each scan line comprising pixel data;

alternately outputting scan lines from the MPEG decoder from the top and bottom of the High Definition frame;

separating the pixel data in the High Definition scan lines into the predetermined number of frames of Standard Definition scan lines;

writing the pixel data in the separated scan lines into a number of FIFOs corresponding to the predetermined number of encoded Standard Definition frames;

generating Standard Definition timing signals for each Standard Definition frame; and, outputting the Standard Definition timing signals and the pixel data in each FIFO to a video encoder communicating with the respective FIFO.

2. The method of claim 1 where the step of separating the pixel data in the High Definition scan lines into the predetermined number of frames of Standard Definition scan lines further comprises:

skipping over the unused portion of each High Definition scan line until the start of active video pixels;

reading pixel data from the start of the active video pixels until a completed Standard Definition scan line is read; and, asserting a write strobe for the FIFO corresponding to each Standard Definition frame when a completed scan line for that frame is read.

3. The method of claim 2 further comprising the step of extracting audio data from the HANC region of the High Definition scan line.

4. The method of claim 1 where the predetermined number of Standard Definition frames is four.

5. A system for extracting a predetermined number of Standard Definition frames from an MPEG-encoded High Definition video frame containing a predetermined number of Standard Definition frames, the system comprising:

a High Definition MPEG decoder operative to recover the High Definition data stream; the decoded data stream comprising High Definition scan lines; each scan line comprising pixel data; the MPEG decoder alternately outputting scan lines from the top and bottom of the High Definition frame;

a frame-separating component communicating with the MPEG decoder; the frame-separating component operative to separate the pixel data in the High Definition scan lines into a predetermined number of frames of Standard Definition scan lines;

a predetermined number of FIFOs communicating with the frame-separating component for receiving the pixel data corresponding to the predetermined number of Standard Definition frames;

an output logic component to generate Standard Definition timing signals for each Standard Definition frame; and, a video encoder communicating with the respective FIFOs and output logic components to output the respective Standard Definition analog signals.

6. The system of claim 5 where the number of Standard Definition frames is four.

7. The system of claim 5 where the FIFOs communicating with the frame-separating component are each 720 by 16 bits.

8. A computer-readable medium, having computer-readable instructions for performing a method for extracting a predetermined number of Standard Definition frames from an MPEG-encoded High Definition video frame containing a predetermined number of Standard Definition frames, the method comprising:

passing the High Definition data stream through a High Definition MPEG decoder to recover the High Definition decoded data stream; the decoded data stream comprising High Definition scan lines; each scan line comprising pixel data;

alternately outputting scan lines from the MPEG decoder from the top and bottom of the High Definition frame;

separating the pixel data in the High Definition scan lines into the predetermined number of frames of Standard Definition scan lines;

writing the pixel data in the separated scan lines into a number of FIFOs corresponding to the predetermined number of encoded Standard Definition frames;

generating Standard Definition timing signals for each Standard Definition frame; and, outputting the Standard Definition timing signals and the pixel data in each FIFO to a video encoder communicating with the respective FIFO.

9. The computer-readable medium of claim 8, where the method further comprises the steps of:

skipping over the unused portion of each High Definition scan line until the start of active video pixels;

reading pixel data from the start of the active video pixels until a completed Standard Definition scan line is read; and, asserting a write strobe for the FIFO corresponding to each Standard Definition frame when a completed scan line for that frame is read.

10. The computer-readable medium of claim 9, where the method further comprises the step of extracting audio data from the HANC region of the High Definition scan line.

11. The computer-readable medium of claim 8, where the predetermined number of Standard Definition frames is four.

12. A method for extracting a predetermined number of Standard Definition frames from an MPEG-encoded High Definition video frame containing a predetermined number of Standard Definition frames, the method comprising:

passing the High Definition data stream through a High Definition MPEG decoder to recover the High Definition decoded data stream;

parsing the High Definition decoded data stream into High Definition scan lines;

writing the High Definition scan lines sequentially to a frame buffer until the frame buffer holds High Definition scan lines defining one High Definition frame;

the scan lines comprising pixel data;

separating the pixel data in the High Definition scan lines into one or more frames of Standard Definition scan lines;

writing the pixel data in the separated scan lines into a number of FIFOs corresponding to the number of encoded Standard Definition frames;

generating Standard Definition timing signals for each Standard Definition frame; and, outputting the Standard Definition timing signals and the pixel data in each FIFO to a video encoder communicating with the respective FIFO.

13. The method of claim 12 where the step of separating the pixel data in the High Definition scan lines into the predetermined number of frames of Standard Definition scan lines further comprises:

skipping over the unused portion of each High Definition scan line until the start of active video pixels;

reading pixel data from the start of the active video pixels until a completed Standard Definition scan line is read; and, asserting a write strobe for the FIFO corresponding to each Standard Definition frame when a completed scan line for that frame is read.

14. The method of claim 13 further comprising the step of extracting audio data from the HANC region of the High Definition scan line.

15. The method of claim 12 where the predetermined number of Standard Definition frames is four.

16. A system for extracting a predetermined number of Standard Definition frames from an MPEG-encoded High Definition video frame containing a predetermined number of Standard Definition frames, the system comprising:

a High Definition MPEG decoder operative to recover the High Definition data stream; the decoded data stream comprising High Definition scan lines; each scan line comprising pixel data;

a parsing component communicating with the MPEG decoder to parse the High Definition pixel data into High Definition scan lines;

a frame buffer communicating with the parsing component to receive parsed High Definition scan lines and hold one High Definition frame;

a frame-separating component communicating with the frame buffer; the frame-separating component operative to separate the pixel data in the High Definition scan lines into a predetermined number of frames of Standard Definition scan lines;

a predetermined number of FIFOs communicating with the frame-separating component for receiving the pixel data corresponding to the predetermined number of Standard Definition frames;

an output logic component to generate Standard Definition timing signals for each Standard Definition frame; and, a video encoder communicating with the respective FIFOs and output logic components to output the respective Standard Definition analog signals.

17. The system of claim 16 where the number of Standard Definition frames is four.

18. The system of claim 16 where the FIFOs communicating with the frame-separating component are each 720 by 16 bits.

19. A computer-readable medium, having computer-readable instructions for performing a method for extracting a predetermined number of Standard Definition frames from an MPEG-encoded High Definition video frame containing a predetermined number of Standard Definition frames, the method comprising:

passing the High Definition data stream through a High Definition MPEG decoder to recover the High Definition decoded data stream;

parsing the High Definition decoded data stream into High Definition scan lines;

writing the High Definition scan lines sequentially to a frame buffer until the frame buffer holds High Definition scan lines defining one High Definition frame;

the scan lines comprising pixel data;

separating the pixel data in the High Definition scan lines into one or more frames of Standard Definition scan lines;

writing the pixel data in the separated scan lines into a number of FIFOs corresponding to the number of encoded Standard Definition frames;

generating Standard Definition timing signals for each Standard Definition frame; and, outputting the Standard Definition timing signals and the pixel data in each FIFO to a video encoder communicating with the respective FIFO.

20. The computer-readable medium of claim 19, where the method further comprises the steps of:
- skipping over the unused portion of each High Definition scan line until the start of active video pixels;
- reading pixel data from the start of the active video pixels until a completed Standard Definition scan line is read; and, asserting a write strobe for the FIFO corresponding to each Standard Definition frame when a completed scan line for that frame is read.

21. The computer-readable medium of claim 20, where the method further comprises the step of extracting audio data from the HANC region of the High Definition scan line.

22. The computer-readable medium of claim 19, where the predetermined number of Standard Definition frames is four.

* * * * *